US010556751B2

(12) United States Patent
Peutert et al.

(10) Patent No.: US 10,556,751 B2
(45) Date of Patent: Feb. 11, 2020

(54) MANUALLY STEERED AUGER MOVER

(71) Applicant: Brandt Industries Canada Limited, Regina (CA)

(72) Inventors: Chance Peutert, Belle Plaine (CA); Jonathan Robert Carteri, Regina (CA)

(73) Assignee: Brandt Industries Canada Limited, Regina (CA)

( * ) Notice: Subject to any disclaimer, the term of this patent is extended or adjusted under 35 U.S.C. 154(b) by 0 days.

(21) Appl. No.: 15/985,018

(22) Filed: May 21, 2018

(65) Prior Publication Data

US 2018/0362259 A1 Dec. 20, 2018

(30) Foreign Application Priority Data

Jun. 19, 2017 (CA) ..................................... 2970872

(51) Int. Cl.
| | |
|---|---|
| *B65G 41/00* | (2006.01) |
| *B65G 33/24* | (2006.01) |
| *B62D 1/02* | (2006.01) |
| *B65G 33/00* | (2006.01) |
| *B65H 41/00* | (2006.01) |
| *B60B 33/00* | (2006.01) |

(52) U.S. Cl.
CPC .......... *B65G 41/008* (2013.01); *B60B 33/006* (2013.01); *B60B 33/0026* (2013.01); *B62D 1/02* (2013.01); *B65G 33/00* (2013.01); *B65G 33/24* (2013.01); *B65H 41/00* (2013.01); *B60B 33/0068* (2013.01); *B60B 33/0076* (2013.01)

(58) Field of Classification Search
CPC ........ B65G 33/00; B65G 33/24; B65G 41/00; B65G 41/008; B62D 1/02; B62D 1/12; B62D 7/06; B62D 7/08; B60B 33/0068; B60B 33/0076; B60B 33/006; B60B 33/0026
USPC ........................................................ 198/304
See application file for complete search history.

(56) References Cited

U.S. PATENT DOCUMENTS 4,351,428 A * 9/1982 Long .................... B65G 41/008
198/302
4,469,191 A * 9/1984 Truninger ............... B66C 23/62
180/233

(Continued)

OTHER PUBLICATIONS

Commander Ag-Quip, Grain Commander Self Propelled Augers, dated Feb. 10, 2017, downloaded from http://www.commanderagquip.com.au/mobile-augers, 2 pgs.

(Continued)

*Primary Examiner* — Gene O Crawford
*Assistant Examiner* — Keith R Campbell
(74) *Attorney, Agent, or Firm* — Frost Brown Todd LLC; Nicole M. Tepe

(57) ABSTRACT

An auger mover for moving and steering an auger is provided. The auger mover can have a frame having a front end and a rear end, the rear end connectable to an auger axle on the auger, a first pivotal wheel attached to a front end of the frame and pivotal relative to the frame, a second pivotal wheel attached to a front end of the frame and pivotal relative to the frame independently of the first pivotal wheel, an auger connection assembly connected to the frame and connectable to the auger and a steering assembly operatively connected to the first pivotal wheel to pivot the first pivotal wheel.

29 Claims, 3 Drawing Sheets

(56) References Cited

U.S. PATENT DOCUMENTS

| | | | | |
|---|---|---|---|---|
| 4,607,740 A * | 8/1986 | Jelbart | ............... | B65G 41/002 198/320 |
| 4,726,459 A * | 2/1988 | Vos | ............... | B65G 41/008 180/65.51 |
| 4,739,868 A * | 4/1988 | Head | ............... | B65G 41/002 198/316.1 |
| 8,118,151 B1 * | 2/2012 | Jesse | ............... | B65G 33/14 180/16 |
| 8,365,896 B2 * | 2/2013 | Jesse | ............... | B65G 33/14 180/16 |
| 9,499,348 B2 * | 11/2016 | Teichrob | ............... | B65G 37/00 |

OTHER PUBLICATIONS

Commander Ag-Quip, Series 4 Grain Commander, Brochure, dated Feb. 23, 2017 downloaded from http://www.commanderagquip.com.au/_literature_149349/Grain_Commander_Auger_Brochure, 4 pgs.

Commander Ag-Quip, Self-Propelled Augers, YouTube Video, dated May 22, 2018, available at https://youtu.be/DU1n_OnE9iE, screen shot only, 1 pg.

Meridian Manufacturing, Inc., Auger Accessories, dated Jun. 2, 2017, downloaded from https://www.meridianmfg.com/auger-accessories/, 2 pgs.

Meridian Manufacturing, Inc., Meridian Frame Mount Auger Mover, Brochure, dated Oct. 18, 2015, downloaded from http://www.meridianmfg.com/wp-content/uploads/2014/06/meridian-frame-mount-auger-mover.pdf, 2 pgs.

Meridian Manufacturing, Inc., Meridian Conventional Auger Product Demo, YouTube Video, dated Oct. 15, 2014, available at https://youtu.be/oiPU4vekLIQ, screen shot only, 1 pg.

Westfield, Straight Augers, dated Feb. 9, 2018, downloaded from https://www.grainaugers.com/products/straight-augers/, 2 pgs.

Westfield, TFX2 Series Augers, Brochure, dated Jun. 30, 2017, downloaded from http://www.grainaugers.com/site/assets/files/518625/2016_westfield_tfx2_singles_web.pdf, 6 pgs.

Westfield, STX2 Series Truck Augers, Brochure, dated Apr. 26, 2018, downloaded from https://shachtay.com/helper/viewpdf/tar/aHR0cHM6Ly93d3cuZXF1aXBtZW50c2VhcmNoLmNvbS8vdXBsb2FkZWRpbWFnZXMvODQ2NS8yMDE3X3dlc3RmaWVsZF9zdHgyX3dlYi5wZGY=, 4 pgs.

* cited by examiner

MANUALLY STEERED AUGER MOVER

CROSS-REFERENCE TO RELATED APPLICATION

This application claims priority to and benefit of CA Serial No. 2,970,872, filed Jun. 19, 2017, the contents of which are incorporated by reference in their entirety for all purposes.

FIELD OF THE INVENTION

The present invention relates to an auger mover and more particularly to a steering assembly to control the direction of travel of the auger mover.

BACKGROUND

Grain augers are used to carry grain and crop materials from near the ground to the top of a grain bin so that the grain or other crop material can be discharged from the end of the auger into the bin. Grain augers typically have an long tubular auger body with an intake end and a discharge end, the crop material enters the auger through the intake end where fighting inside the auger rotates and carries the crop material up the inside of the auger body to be discharged out of the auger at the discharge end of the auger. Typically, a pair of ground wheels are used to support and move the auger and the ground wheels are connected to the auger body by a framework.

Previously, when grain augers were relatively small because the bins to be loaded with the crop material were also relatively small, an operator would simply lift up the discharge end of the auger body, which would typically rest on the ground surface, and manually push the auger using the wheels to move the auger relatively small distances, such as from one grain bin that has been filled to an adjacent empty grain bin. However, as grain bins have gotten bigger, augers have too. Most augers these days are much larger than the first augers and they are too big and heavy for a person to simply lift the discharge end of the auger body off of the ground and push the auger around using its wheels.

To allow these newer, larger and heavier augers to be moved, these augers often have driven ground wheels to move the auger and also some sort of steering system to allow an operator to steer the moving auger in a desired direction. However, these present systems can be complicated to operate and may not be as maneuverable or easy to operate as an operator might want.

BRIEF SUMMARY

In an aspect, an auger mover for moving and steering an auger is provided. The auger mover can have a frame having a front end and a rear end, the rear end connectable to an auger axle on the auger, a first pivotal wheel attached to a front end of the frame and pivotal relative to the frame, a second pivotal wheel attached to a front end of the frame and pivotal relative to the frame independently of the first pivotal wheel, an auger connection assembly connected to the frame and connectable to the auger and a steering assembly operatively connected to the first pivotal wheel to pivot the first pivotal wheel.

In a further aspect, an auger is provided. The auger can have an auger body having an intake end and a discharge end, an auger axle connected to the auger body, a first drive wheel and a second drive wheel connected to the auger, a frame having a front end and a rear end, the rear end of the frame connected to the auger axle, a first pivotal wheel attached to a front end of the frame and pivotal relative to the frame, a second pivotal wheel attached to a front end of the frame and pivotal relative to the frame independently of the first pivotal wheel, an auger connection assembly connected between the frame and the auger body and a steering assembly operatively connected to the first pivotal wheel to pivot the first pivotal wheel.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
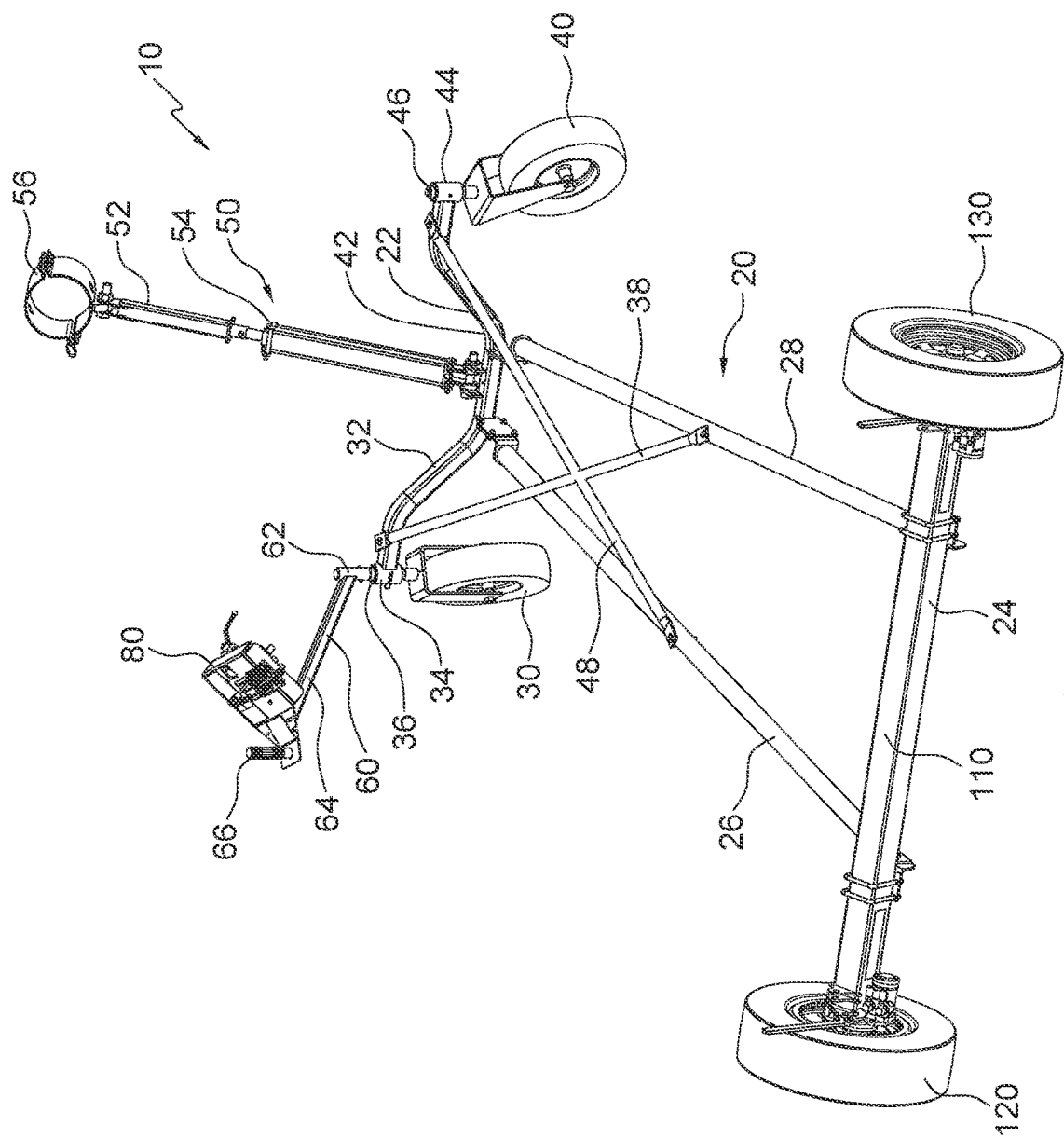
FIG. 1 is a perspective view of an auger mover for connection to an auger to make it easier to move the auger from location to location.
Figure 2:
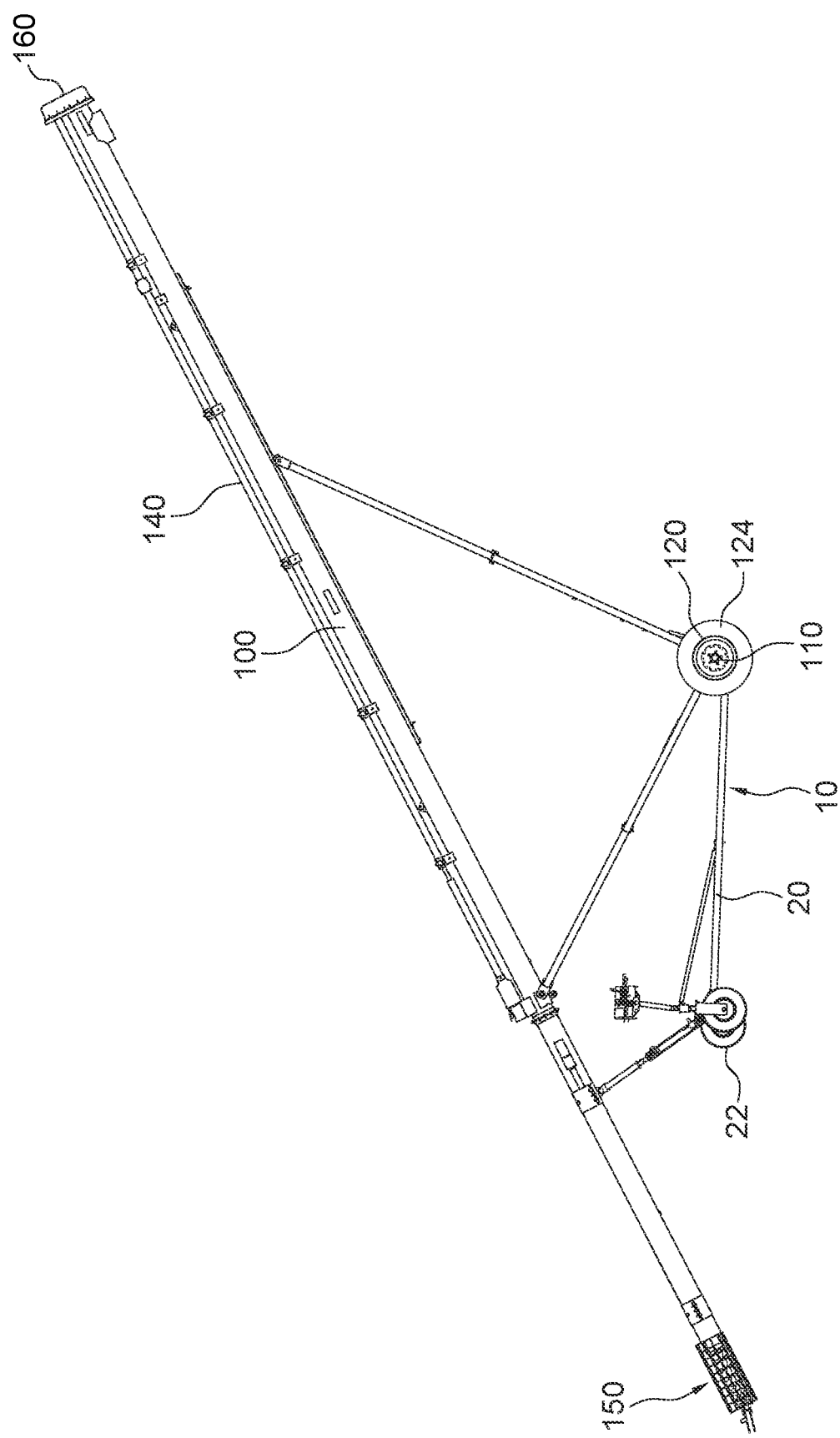
FIG. 2 is a side view of the auger mover of FIG. 1 attached to an auger.
Figure 3:
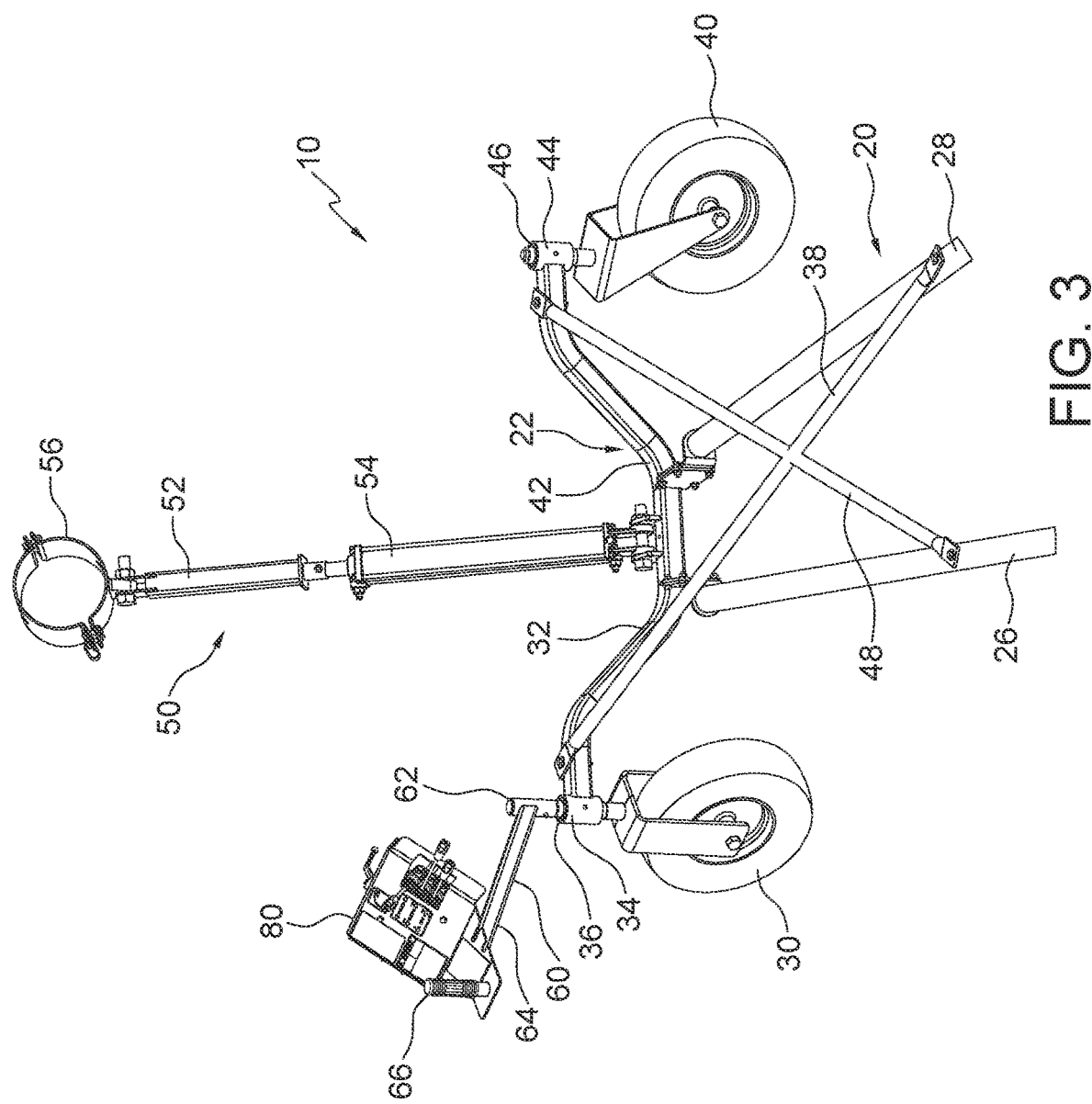
FIG. 3 is a close up view of the pivotal wheels and steering assembly for the auger mover shown in FIG. 1.

FIG. 1 shows a manually steered auger mover 10 for moving an auger around between locations. FIG. 2 shows the auger mover 10 attached to an auger 100.

The auger mover 10 can include: a frame 20; a first pivotal wheel 30; a second pivotal wheel 40; an auger connection assembly 50; a steering assembly 60; and a control panel 80.

The frame 20 can have a front end 22 and a rear end 24 and is used to support the different components of the auger mover 10. A pair of frame rails 26, 28 can extend along the length of the frame 20 from the front end 22 of the frame 20 to the rear end 24 of the frame 20. A first wheel member 32 and a second wheel member 42 can be provided at the front end 22 of the frame 20 and the first wheel member 32 and the second wheel member 42 can curve upwards before extending along a substantially horizontal portion. A first tube 34 can be provided on the end of the first wheel member 32 and a second tube 44 can be provided on the end of the second wheel member 42.

The first pivotal wheel 30 can be provided at a front end 22 of the frame 20 and can be connectable to the first tube 34 of the first wheel member 32 or the second tube 44 on the second wheel member 42. The first pivotal wheel 30 can be pivotally connected below either the first tube 34 of the first wheel member 32 or the second tube 44 of the second wheel member 42 by a kingpin or shaft 36 extending vertically upwards from the first pivotal wheel 30. The shaft 36 can be positioned relative to the first pivotal wheel 30 so that a steering axis defined by the shaft 36 and passing downwards through the first pivotal wheel 30 will pass substantially through the center of the first pivot wheel 30. In this manner, the first pivotal wheel 30 will pivot around the steering axis defined by the shaft 36 when the first pivotal wheel 30 is turned. The shaft 36 will pivotally connect the first pivotal wheel 30 to the first tube 34 on the end of the first wheel member 32 so that the first pivotal wheel 30 is positioned below the first wheel member 32 and pivotally connected to the first wheel member 32. In one aspect, the shaft 36 may extend through the first tube 34 so that a portion of the shaft 36 extends above the top of the first tube 34.

The second pivotal wheel 40 can be provided at the front end 22 of the frame 20 on an opposite side of the frame 20 from the first pivotal wheel 30 and can be a castor wheel. The second pivotal wheel 40 can be pivotally connected below either the second tube 44 of the second wheel member 42 or the first tube 34 of the first wheel member 32 (whichever one the first pivotal wheel 30 is not connected to) by a shaft 46 extending upwards from the second pivotal wheel 40. In this manner, an operator can decide what side of the auger mover 10 to place the steering assembly 60 on, allowing the operator to choose how to set up the auger mover 10. The second pivotal wheel 40 can be pivotally connected below the second wheel member 42 of the frame 20, for example, by the shaft 46 extending vertically upwards from the second pivotal wheel 40 and extending through the second tube 44 on the end of the second wheel member 42 so that the second pivotal wheel 40 is positioned below the second wheel frame 42 and pivotally connected to the second wheel member 42. A steering axis defined by the shaft 46 will be offset from the center of the second pivotal wheel 40 so that extending the steering axis downwards from the shaft 46, the steering axis will not pass through the center of the second pivotal wheel 40. In one aspect, the shaft 46 may extend through the second tube 44 or the first tube 34 so that a portion of the shaft 46 extends above the top of the second tube 44 or first tube 34.

A first bracing member 38 can extend between the first wheel member 32 proximate the end of the first wheel member 32 and the second frame rail 28 and a second bracing member 48 can extend between the second wheel member 42 proximate the end of the second wheel member 42 and the first frame rail 26. In this manner, the first bracing member 38 and the second bracing member 48 can be used to make the auger mover 10 more rigid.

Referring to FIG. 2, the auger mover 10 can be connected to an auger 100. The auger 100 can have an intake end 150 and a discharge end 160 with a tubular auger body 140 running from the intake end 150 to the discharge end 160. Flighting (not shown) can be provided inside the tubular auger body 140 to carry particulate material, such as grain or other crop material, up the tubular auger body 140 from the intake end 150 of the auger 100 to the discharge end 160 of the auger 100. The auger 100 can have drive wheels 120 provided on an auger axle 110 to move the auger 100 from place to place.

Referring to FIGS. 1 and 2, the auger mover 10 can be connected to the auger 100 with the rear end 24 of the frame 20 attached to the auger axle 110 of the auger 100 so that the frame 20 extends from it rear end 24 connected to the auger axle 110 towards the front end 22 of the frame 20. The auger axle 110 can be connected to the first drive wheel 120 and the second drive wheel 130 which are attached to hydraulic motors that can drive the first drive wheel 120 and the second drive member 130.

The auger connection assembly 50 can be provided at the front end 22 of the frame 20 and connected to the auger body the auger mover 10 is connected to. The auger connection assembly 50 can include: a hydraulic cylinder 52; an extension member 54; and an auger body collar 56. The auger body collar 56 can connect around the body of the auger 10 and the hydraulic cylinder 52 can be used to raise and lower the auger body collar 52 and therefore the auger body relative to the frame 20 of the auger mover 10 in order to lift the discharge end 160 of the auger 100 off of the ground so that the auger 100 can be moved by the auger 100. The extension member 54 can be used to provide the desired length of the auger connection assembly 50 between the frame 20 and the auger body.

The steering assembly 60 can be removably connectable to the first pivotal wheel 30 so that moving the steering assembly 60 will pivot the first pivotal wheel 30. The steering assembly 60 can have a steering shaft 62 that is removably connectable to the shaft 36 connected to the first pivotal wheel 30 and extending above the first tube 34 on the first wheel member 32 so that rotation of the steering shaft 62 will rotate the first pivotal wheel 30. Because the first pivotal wheel 30 can be connected to either the first tube 34 of the first wheel member 32 or the second tube 44 of the second wheel member 42, the operator can decide which side of the auger 100 they would like to be on when using the auger mover 10 to move the auger 100. For example, if one side of the auger 100 will be moved close to the side of a bin or other structure, the operator can connect the first pivotal wheel 30 and the steering assembly 60 to the wheel member 32, 42 on the other side of the auger 100. The second pivotal wheel 40 can then be connected to the wheel member 32, 42 that the first pivotal wheel 30 is not connected to.

The steering assembly 60 can have a steering member 64 can extend generally laterally from the steering shaft 62 with the distal end of the steering member 64 connected to the steering shaft 62. On the proximal end of the steering member 64 a handle 66 and the control panel 80 can be provided. The handle 66 can be used by an operator to rotate the steering member 64, thereby rotating the steering shaft 62, the shaft 36 and thereby rotating the first pivotal wheel 30 around the steering axis defined by the shaft 36 in the direction desired. By turning the first pivotal wheel 30, the direction of travel of the auger mover 10 can be altered. The second pivotal wheel 40 will simply pivot freely and because second pivotal wheel 40 is a caster wheel with the steering axis defined by the shaft 46 is offset from the center of the second pivotal wheel 40, the second pivotal wheel 40 will pivot to follow the travel direction of the auger mover 10.

The control panel 80 can control the operation of both the auger mover 10 and the auger the auger mover 10 is connected to. Typically, the control panel 80 will contain hydraulic control valves that control the flow of hydraulics on the auger in order to control the operation of the auger. For example, the control panel 80 could control the rotation of the fighting in the auger body, the operation of the first drive wheel 120 and the second drive wheel 130, the extension and retraction of the hydraulic cylinder 52 in the auger connection assembly 50 and/or any other functions performed by the auger and/or the auger mover 10. In one aspect, the control panel 80 can have a joystick to control some of the hydraulics on either the auger and/or the auger mover 10.

The control panel 80 can be provided at the proximal end of the steering arm 50 so that an operator can turn the auger mover 10 using the handle 66 on the steering arm 50, yet still have access to the controls provided on the control panel 80 to controlling the operation of the auger and the auger mover 10 while turning the auger mover 10 using the steering assembly 50. An operator can use one hand on the handle 66 to rotate the steering arm 64 in either direction. Rotation of the steering arm 64 will in turn rotate the steering shaft 62, shaft 36 and thereby the first pivotal wheel 30, the rotated first pivotal will 30 will change the direction of travel of the auger mover 10. The second pivotal wheel 40 will simply pivot and follow the travel direction of the auger mover 10 that is being directed by the first pivotal wheel 30 and the steering assembly 50. At the same time, the operator's other hand is free to operate any of the controls on the control panel 80 such as the controls regulating the amount of hydraulic fluid routed to the drive wheels 120, 130 to drive the auger mover 10. By placing the control panel 80 at the proximate end of the steering arm 64 close to the handle 66, the operator can simultaneously control the operation of the auger 100 using the control panel 80 and steer the auger mover 10 and the auger 10 using the handle 66.

Because the first pivot wheel 30 and second pivotal wheel 40 are not connected by any sort of steering linkages and the second pivotal wheel 40 is free to pivot freely in the direction of travel of the auger mover 10, the auger mover 10 is more maneuverable than one where the steering wheels are connected by linkages. The first pivotal wheels 30 and the second pivotal wheel 40 can pivot to the point where they are both positioned parallel or substantially parallel to the auger axle 119 allowing the auger 100 to be turned substantially perpendicular to the length of the auger 100 by the auger mover 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An auger mover for moving and steering an auger, the auger mover comprising:
    a frame having a front end and a rear end, the rear end connectable to an auger axle on the auger;
    a first pivotal wheel attached to the front end of the frame and pivotal relative to the frame;
    a second pivotal wheel attached to the front end of the frame and pivotal relative to the frame independently of the first pivotal wheel;
    an auger connection assembly connected to the frame and connectable to the auger; and
    a steering assembly operatively connected to the first pivotal wheel to pivot the first pivotal wheel,
    wherein the first pivotal wheel is pivotal around a first steering axis passing substantially through a center of the first pivotal wheel and wherein the second pivotal wheel is pivotal around a second steering axis offset from a center of the second pivotal wheel so that the second pivotal wheels pivots in a travel direction of the auger mover.

2. The auger mover of claim 1 further comprising a control panel connected to the steering assembly.

3. The auger mover of claim 1 wherein the frame comprises a pair of frame rails extending from the front end of the frame to the rear end of the frame.

4. The auger mover of claim 3 further comprising: a first wheel member provided at the front end of the frame; a first tube provided on an end of the first wheel member; a second wheel member provided at the front end of the frame; and a second tube provided on an end of the second wheel member, the first pivotal wheel removably connectable to both the first tube and the second tube and the second pivotal wheel removably connectable to both the first tube and the second tube.

5. The auger mover of claim 4 wherein the first wheel member and the second wheel member curve upwards from the pair of frame rails before extending along a substantially horizontal plane.

6. The auger mover of claim 4 further comprising a first shaft extending vertically upwards from the first pivotal wheel.

7. The auger mover of claim 6 wherein the first pivotal wheel pivots around the first steering axis defined by the first shaft and passing downwards substantially through the center of the first pivotal wheel.

8. The auger of claim 7 wherein the first shaft pivotally connects the first pivotal wheel to one of: the first tube on the end of the first wheel member with the first pivotal wheel positioned below the first wheel member; and the second tube on the end of the second wheel member with the first pivotal wheel positioned below the second wheel member.

9. The auger of claim 8 wherein the first shaft extends through the first tube and a portion of the first shaft extends above a top of the first tube.

10. The auger mover of claim 1 wherein the second pivotal wheel is a castor wheel.

11. The auger mover of claim 4 wherein the second pivotal wheel is pivotally connectable below the second wheel member of the frame by a second shaft extending vertically upwards from the second pivotal wheel and extending through the second tube on the end of the second wheel member so that the second pivotal wheel is positioned below the second wheel frame and pivotally connected to the second wheel member to follow a travel direction the auger mover.

12. The auger mover of claim 11 wherein the second pivotal wheel pivots around the second steering axis defined by the second shaft and offset from the center of the second pivotal wheel.

13. The auger mover of claim 1 wherein the auger connection assembly is connected to the front end of the frame.

14. The auger mover of claim 1 wherein the auger connection assembly comprises: an auger body collar connectable to an auger body; and a hydraulic cylinder operative to raise and lower the auger body collar.

15. The auger mover of claim 6 wherein the steering assembly comprises a steering shaft removably connectable to the first shaft.

16. The auger of claim 15 wherein the steering assembly further comprises: a steering member having a distal end and a proximal end, the steering member connected at the distal end to the steering shaft and extending generally laterally from the steering shaft; a handle provided on the proximal end of the steering member, wherein moving the handle rotates the steering member and the steering shaft, rotating the first shaft and pivoting the first pivotal wheel.

17. The auger of claim 16 further comprising a control panel provided at the proximal end of the steering member.

18. The auger mover of claim 1 wherein the steering assembly is removably connectable to the first pivotal wheel.

19. An auger comprising:
    an auger body having an intake end and a discharge end;
    an auger axle connected to the auger body;
    a first drive wheel and a second drive wheel connected to the auger;
    a frame having a front end and a rear end, the rear end of the frame connected to the auger axle;
    a first pivotal wheel attached to the front end of the frame and pivotal relative to the frame;
    a second pivotal wheel attached to the front end of the frame and pivotal relative to the frame independently of the first pivotal wheel;

an auger connection assembly connected between the frame and the auger body; and a steering assembly operatively connected to the first pivotal wheel to pivot the first pivotal wheel, wherein the first pivotal wheel is pivotal around a first steering axis passing substantially through a center of the first pivotal wheel and wherein the second pivotal wheel is pivotal around a second steering axis offset from a center of the second pivotal wheel so that the second pivotal wheels pivots in a travel direction of the auger.

20. The auger of claim 19 further comprising a control panel connected to the steering assembly.

21. The auger of claim 20 further comprising: a first wheel member provided at the front end of the frame; a first tube provided on an end of the first wheel member; a second wheel member provided at the front end of the frame; and a second tube provided on an end of the second wheel member, the first pivotal wheel removably connectable to both the first tube and the second tube and the second pivotal wheel removably connectable to both the first tube and the second tube.

22. The auger of claim 21 wherein the first wheel member and the second wheel member curve upwards from a pair of frame rails before extending along a substantially horizontal plane.

23. The auger of claim 22 further comprising a first shaft extending vertically upwards from the first pivotal wheel.

24. The auger of claim 23 wherein the first pivotal wheel pivots around the first steering axis defined by the first shaft and passing downwards substantially through the center of the first pivotal wheel.

25. The auger of claim 24 wherein the first shaft pivotally connects the first pivotal wheel to one of: the first tube on the end of the first wheel member with the first pivotal wheel positioned below the first wheel member and pivotally connected to the first wheel member; and the second tube on the end of the second wheel member with the first pivotal wheel positioned below the second wheel member.

26. The auger of claim 19 wherein the second pivotal wheel is a castor wheel.

27. The auger of claim 21 wherein the second pivotal wheel is connected to a second shaft and wherein the second shaft pivotally connects the second pivotal wheel to one of: the second tube on the end of the second wheel member with the second pivotal wheel positioned below the second wheel member; and the first tube on the end of the first wheel member with the second pivotal wheel positioned below the second wheel member.

28. The auger of claim 27 wherein the second pivotal wheel pivots around the second steering axis defined by the second shaft and offset from the center of the second pivotal wheel.

29. The auger of claim 24 wherein the steering assembly comprises: a steering shaft removably connectable to the first shaft; a steering member having a distal end and a proximal end, the steering member connected at the distal end to the steering shaft and extending generally laterally from the steering shaft; a handle provided on the proximal end of the steering member, wherein moving the handle rotates the steering member and the steering shaft, rotating the first shaft and pivoting the first pivotal wheel.

* * * * *